United States Patent [19]

Otsuki et al.

[11] Patent Number: 4,962,881
[45] Date of Patent: Oct. 16, 1990

[54] FLOW PASSAGE COUPLING UNIT

[75] Inventors: Noboru Otsuki, Akashi; Toshihiko Oonishi, Kakogawa; Katsumi Tomioka, Kobe; Kozo Miura, Hiroshima, all of Japan

[73] Assignees: Nippon Air Brake K.K., Kobe; Hirotec Corporation, Hiroshima, both of Japan

[21] Appl. No.: 503,783

[22] Filed: Apr. 3, 1990

Related U.S. Application Data

[63] Continuation-in-part of Ser. No. 319,339, Mar. 6, 1989, abandoned.

Foreign Application Priority Data

Mar. 28, 1988 [JP] Japan .............................. 63-41614[U]

[51] Int. Cl.$^5$ .............................................. F16L 37/28
[52] U.S. Cl. .................................................. 251/149.7
[58] Field of Search ........................... 251/149.7, 149.6

[56] References Cited

U.S. PATENT DOCUMENTS

| 1,767,391 | 6/1930 | Muller | 251/149.6 |
| 2,024,682 | 12/1935 | Eisenman | 251/149.6 |
| 2,265,267 | 12/1941 | Cowles | 251/149.6 |
| 4,613,112 | 9/1986 | Philipot et al. | 251/149.6 |

FOREIGN PATENT DOCUMENTS

| 780408 | 7/1957 | United Kingdom | 251/149.6 |
| 2134612 | 8/1984 | United Kingdom | 251/149.6 |

Primary Examiner—A. Michael Chambers
Attorney, Agent, or Firm—Kanesaka & Takeuchi

[57] ABSTRACT

A flow passage coupling unit (1) for flow passages (2, 4) of movable and fixed members (3, 5), which includes a cylindrical body (6) secured to the movable member and having a large bore (10) communicating with the flow passage, a small bore (11) and a value seat (12) formed between the large and small bores; a sliding valve (7) having a cylindrical sliding surface (7a) which slidably fits in the small bore and has an axial passage (14), a valve head (17) movable within the large bore, and a through-hole (16) provided through the cylindrical sliding surface adjacent the valve head; a coil spring (13) provided within the large bore for biasing the valve head against the valve seat so that communication between the large bore and the axial passage is normally cut off; and the valve seat (12) made in a plane which is perpendicular to an axis of the sliding valve.

6 Claims, 4 Drawing Sheets

FLOW PASSAGE COUPLING UNIT

CROSS-REFERENCE TO RELATED APPLICATIONS

This is a continuation-in-part of application Ser. No. 319,339 filed Mar. 6, 1989 now abandoned.

BACKGROUND OF THE INVENTION

This invention relates generally to flow passage coupling units and, more particularly, to a flow passage coupling unit for coupling the first passage of the first member and the second passage of the second member.

A conventional flow passage coupling unit such as disclosed in Japanese U.M. Patent Application Kokai No. 60-167,888 is shown in FIG. 4. This flow passage coupling unit includes a coupling unit 53 which consists of a cylindrical body 51 secured to a movable body 50 to which a tube may be connected. A fixed body 55 with a passage 54' is opposed to the coupling unit 53. The cylindrical body 51 has a large bore 56 communicating with a passage 54 of the movable body 50 and a small bore 57 in which a sliding valve 52 fits. A valve seat 58 is made of a conical surface between the large and small bores 56 and 57.

The sliding valve 52 has an axial passage 59 extending in the axial direction and a through-hole 60 through the sliding surface of the sliding valve. A seal ring 61 is mounted on the front end of the sliding valve. The sliding valve 52 has on the rear end a valve head 63 with a conical surface 62 which rests on the valve seat 58. A coil spring 64 forwardly biases the sliding valve 52.

In operation, the movable body 50 is moved forwardly so that the seal ring 61 of the sliding valve 52 abuts the coupling surface 65 of the fixed body 55. When the movable body 50 is further moved forwardly, the sliding valve 52 is moved backwardly with respect to the cylindrical body 51 against the bias of the spring 64. Consequently, the valve head 63 is moved away from the valve seat 58 to couple the passage 54 of the movable body 50 to the passage 54' of the fixed body 55 through the large bore 56, the through-hole 60, and the axial passage 59.

However, the valve head 63 and the valve seat 62 of the above flow passage coupling unit are made of conical surfaces so that the increasing rate of opening space between the valve head 63 and the valve seat 62 is not so high as the moving rate of the sliding valve 52. Consequently, in order to provide the desired area of the opening space, it is necessary to move the sliding valve 52 to a large extent, resulting in the large unit size.

SUMMARY OF THE INVENTION

Accordingly, it is an object of the present invention to provide a flow passage coupling unit which is shorter than the above conventional unit in the sliding direction of the sliding valve.

According to the invention there is provided a flow passage coupling unit for coupling a first passage of a first member and a second passage of a second member, which includes a cylindrical body secured to the first member and having a large bore communicating with the first passage, a small bore, and a valve seat between the large and small bores; a sliding valve provided within the cylindrical body and having an axial passage extending in an axial direction and terminating at a coupling opening; a sealing member mounted on a circumference of the coupling opening; the second member having a coupling surface which is opposed to the sliding valve and at which the second passage opens; the sliding valve having a valve head resting on the valve seat to control communication between the large bore and the axial passage; and the valve seat made in a plane which is perpendicular to an axis of the sliding valve.

When the first body is moved toward the second body, the seal member of the coupling unit abuts the coupling surface of the second body. When the first body is further moved in the same direction, the sliding valve is moved rearwardly with respect to the cylindrical body against the bias of the spring. Consequently, the valve head is moved away from the valve seat so that the large bore and the axial passage are connected through the space between the valve head and the valve seat. This permits communication between the passages of the first and second bodies through the large bore and the axial passage.

At this point, the seal member on the front end of the sliding valve is pressed against the coupling surface to keep the coupling so airtight that no fluid leaks through the coupling. Since the valve head is made in a plane perpendicular to the axis of the sliding valve, when the valve head is moved away from the valve seat, the increasing rate of opening space between the valve head and the valve seat is as high as the moving rate of the sliding valve. As a result, the distance traveled by the sliding valve to provide the desired area of the opening space is minimized.

Other objects, features, and advantages of the invention will be apparent from the following description when taken in conjunction with the accompanying drawings.

DESCRIPTION OF THE PREFERRED EMBODIMENT

Figure 1:
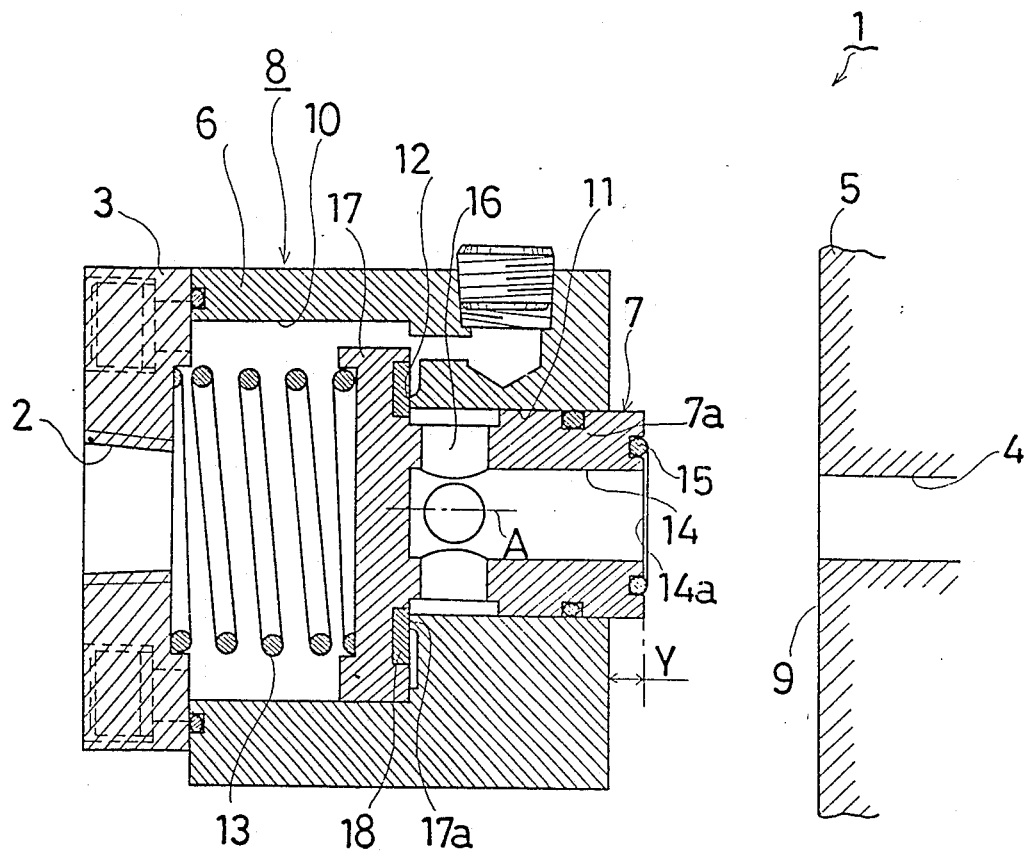
FIG. 1 is a sectional view of a flow passage coupling unit according to an embodiment of the invention in an uncoupled state.

In FIG. 1, a flow passage coupling unit 1 according to an embodiment of the invention is used between a movable body 3 with a passage 2 and a fixed body 5 with a passage 4. A coupling unit 8 consisting of a cylindrical body 6 and a sliding valve 7 is secured to the movable body 3. The fixed body 5 has a coupling surface 9 at which the passage 4 opens. The front end of the sliding valve 7 is opposed to the coupling surface 9.

The cylindrical body 6 secured to the movable body 3 has a large bore 10 communicating with the passage 2 of the movable body 3, a small bore 11 in which the sliding surface 7a of the sliding valve 7 fits, and a valve seat 12 between the large and small bores 10 and 11. A coil spring 13 is placed within the large bore 10 to forwardly bias the sliding valve 7 (to the right in FIG. 1).

The sliding valve 7 has an axial passage 14 extending in the axial direction within the sliding surface 7a and terminating at a coupling opening 14a. An annular seal member 15 is mounted on an end portion surface of the coupling opening 14a. The sliding surface 7a has through-holes 16 adjacent a valve head 17 in which a valve seal 18 is embedded to form an abutment surface 17a for abutting the valve seat 12 of the cylindrical body 6. The location of the valve head 17 controls communication between the large bore 10 and the through-holes 16.

The abutment surface 17a of the valve head 17 is made in a plane which is perpendicular to the axis A of the cylindrical body 6. Alternatively, the abutment surface 17a may be made directly on the valve head 17 without using the valve seal 18. The sliding surface 7a is made to slidably fit in the small bore 11, but it is not necessary that the valve head 17 slidably fits in the large bore 10.

Figure 2:
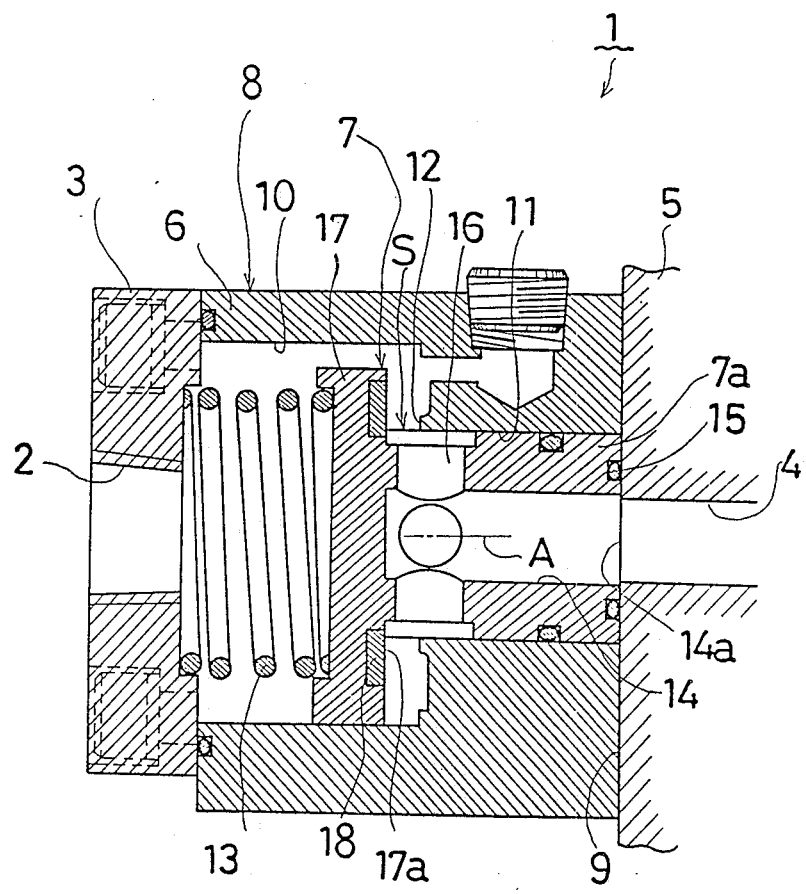
FIG. 2 is a sectional view of the flow passage coupling unit of FIG. 1 in a coupled state.

In operation, when the movable body 3 is moved forwardly by means of a driving cylinder, for example, the seal member 15 of the sliding valve 7 abuts the coupling surface 9 of the fixed body 5. When the movable body 3 is further moved forwardly, the sliding valve 7 is moved rearwardly with respect to the cylindrical body 6 against the bias of the coil spring 13. Consequently, the abutment surface 17a of the valve head 17 is moved away from the valve seat 12 of the cylindrical body 6 so that the large bore 10 and the through-hole 16 are communicated through a space S between the abutment surface 17a and the valve seat 12 as shown in FIG. 2. Thus, the passage 2 of the movable body 3 and the passage 4 of the fixed body 5 are coupled through the large bore 10, the through-holes 16, and the axial passage 14. At the same time, the compressed seal member 15 keeps airtight the coupling between the sliding valve 7 and the coupling surface 9.

Preferably, the sealing member 15 mounted on the end portion surface of the sliding valve 7 is an O-ring as shown in FIG. 1. The sealing power of the O-ring is given by the sum of the pressure acting on the area E caused by a difference in diameter between the seal member 15 and the sliding surface 7a and the pressure caused by the spring 13. Thus, the sliding valve 7 is pressed against the coupling surface 9 by a very large force.

Since the abutment surface 17a of the valve head 17 is made in the plane which is perpendicular to the axis A of the cylindrical body 6, when the sliding valve 7 is moved, the increasing rate of opening space between the abutment surface 17a and the valve seat 12 is as high as the moving rate of the sliding valve 7. In other word, the increasing rate of the opening space is maximized with respect to the movement of the sliding valve 7. Thus, the projecting amount Y of the sliding valve 7 from the cylindrical body 6 is minimized as shown in FIG. 1.

According to *Air Pressure Applications and Circuit Designs* published by Nikkan Kogyo Shinbun Co., where a number of effective passage areas S1, S2, S3, . . . are connected, the combined effective passage area S may be estimated by the following expression:

$$1/S^2 = 1/S1^2 + 1/S2^2 + 1/S3^2 \ldots$$

Thus, in FIG. 2, if S1 is the passage area of the passage 2, S2 the passage area of the large bore 10, S3 the passage area between the large bore 10 and the valve head 17, S4 the passage area between the abutment surface 17a and the valve seat 12, S5 the total passage area of four through-holes 16, and S6 the passage area of the axial passage 14, then the combined effective passage area S of a flow passage coupling unit 1 is given by $$1/S^2 = 1/S1^2 + 1/S2^2 + 1/S3^2 + 1/S4^2 + 1/S5^2 + 1/S6^2 \ldots \quad (1)$$

From Eq. (1), it is apparent that the value of S is maximized when the difference in value of S2–S6 from S1, which is a given value, is minimized. Since only the value of S4 is much smaller than the other values of S2, S3, S5, and S6, which are designed to be substantially equal to the value of S1, it is sufficient to increase the value of S4 to minimize the difference in value of S1–S6.

For this reason, a circumferential groove 20 which is wider than the diameter of the through-holes 16 is provided on the circumferential surface of a stem 21 over the through-holes 16 so that even if the lift amount of the sliding valve 7 is small, the value of S4 becomes large, resulting in the large value of S. Consequently, the projection amount Y of a sliding valve in FIG. 1 becomes very small as determined by dividing the value of S4 given by Eq. (1) by $\pi \times D$, wherein D is the diameter of the sliding surface 7a. Because of the circumferential groove 20 provided on the circumferential surface, the value of S4 increases in proportion to the lift amount of the sliding valve 7.

Specifically, in order to minimize the amount of lift for connection, the coupling unit 8 according to this embodiment satisfies the following relative dimensions.

(1) The cross area of the axial passage 14 is not greater than four times the cross area of a through-hole 16.

(2) The maximum lift between the valve seal 18 and the valve seat 12 is not less than twice the depth of the circumferential groove 20.

(3) The width of the circumferential groove 20 is not less than the diameter of a through-hole 16.

(4) The minimum opening between the through-hole 16 and the valve seat 12 is equal to the minimum area necessary for the flows into the axial passage 14 from the circumferential groove 20 via the through-hole 16 when the sliding valve 7 is moved to the maximum amount of lift. Based on this area, the depth of the circumferential groove 20 is determined.

In the above embodiment, the coupling unit 8 is secured to the movable body 3 and the coupling surface 9 is made on the fixed body 5, but, of course, the coupling unit 8 may be secured to the fixed body 5 and the coupling surface 9 may be made on the movable body 3.

In the flow passage coupling unit according to an embodiment of the invention, the abutment surface of a valve head is made in a plane which is perpendicular to the axis of a cylindrical body so that the increasing rate of an opening space between the valve head and the valve seat is valve to provide the desired area of opening space, thus providing a miniaturized coupling unit.

Figure 3:
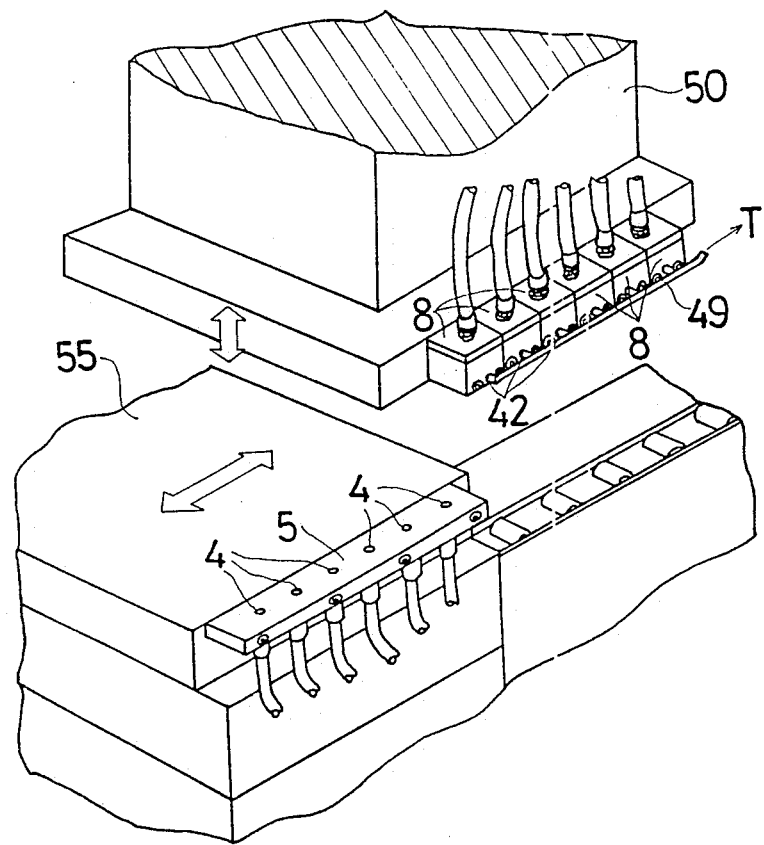
FIG. 3 is a perspective view of part of a press machine for which flow passage coupling units are used.
Figure 4:
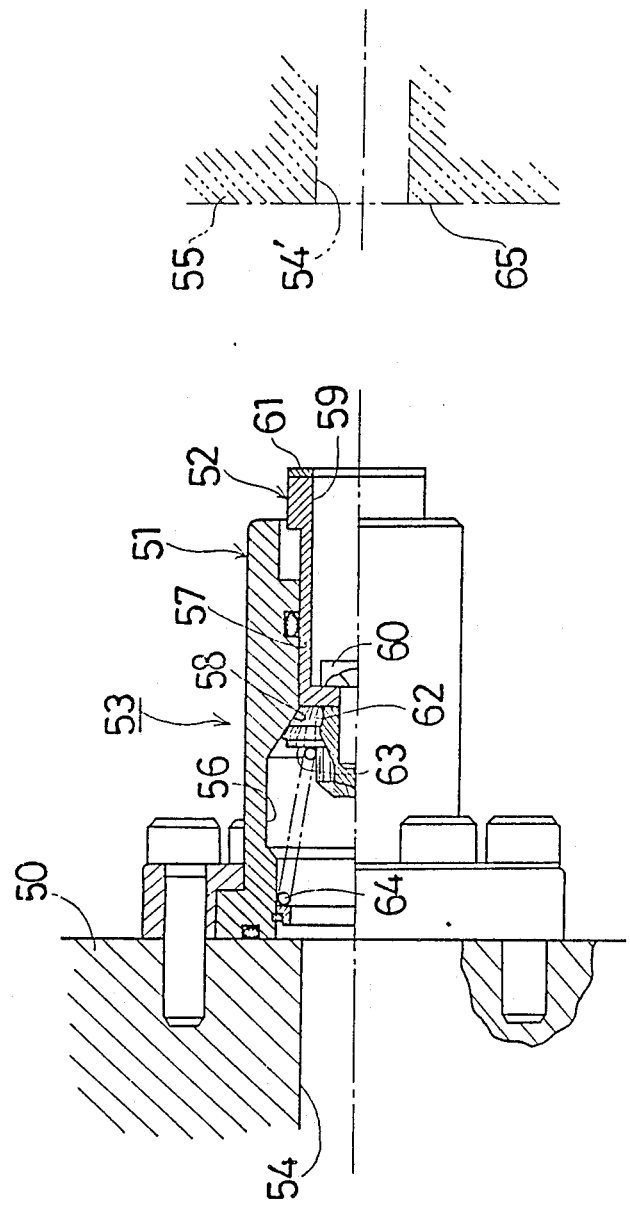
FIG. 4 is a sectional view of a conventional flow passage coupling unit.

In FIG. 3, a number of flow passage coupling units according to the invention are used for a press machine. The first coupling section 8 of each unit is attached to the first metal mold 50 while the second coupling section 5 is attached to the second metal mold 55. As the bolster of the press is moved downwardly, the first coupling sections 8 abut upon the second coupling sections 5 to connect the first passages to the second passages 4, followed by a press operation. The number of the second coupling sections depends upon the metal molds which vary with the types of molding. For this reason, the number of first coupling sections provided is equal to the maximum number of metal molds. Consequently, some first coupling sections are not used depending upon the metal molds used. The drains deposited in the unused first coupling sections are drawn from the drain ports 42 to a tank T via an external pipe 49.

While a preferred embodiment of the invention has been described using specific terms, such description is for illustrative purposes only, and it is to be understood that changes and variations may be made without departing from the spirit and scope of the invention as recited in the appended claims.

We claim:

1. A flow passage coupling unit for coupling a first passage of a first member and a second passage of a second member, which comprises:
    a body secured to said first member and having a large bore communicating with said first passage, a small bore terminating at a coupling opening, and a valve seat formed at a shoulder portion between said large and small bores;
    a sliding valve having a cylindrical sliding surface which slidably fits in said small bore and has an axial passage terminating at a coupling opening, a valve head integral with said cylindrical sliding surface and movable within said large bore, and a through-hole provided through said cylindrical sliding surface adjacent said valve head, said sliding valve having a front end opposite to said valve head projecting from a front end of said cylindrical body by a predetermined distance at a time of non-connection;
    spring means provided within said large bore for biasing said valve head against said valve seat so that communication between said large bore and said axial passage is normally cut off;
    an abutment surface of said valve head made in a plane which is perpendicular to an axis of said sliding valve; and
    said sliding valve is provided with a circumferential groove on a sliding surface thereof over said through-hole, whereby a distance traveled by said sliding valve to provide a desired area of opening space between said valve head and said valve seat is minimized.

2. The flow passage coupling unit of claim 1, wherein said circumferential groove has a width greater than a diameter of said through-hole.

3. The flow passage coupling unit of claim 1, wherein said flow passage coupling unit is characterized in that (1) the cross area of said axial passage is not greater than four times the cross area of said through-hole; (2) the maximum amount of lift is not less than twice the depth of said circumferential groove; (3) the width of said circumferential width is not less than the diameter of said through-hole; and that (4) the minimum opening between said through-hole and said valve seat is equal to the minimum area necessary for flows into said axial passage from said circumferential groove via said through hole.

4. The flow passage coupling unit of claim 3, wherein the depth of said circumferential groove is determined based on said minimum area.

5. A flow passage coupling unit for coupling a first passage of a first member and a second passage of a second member, which comprises:
    a body secured to said first member and having a large bore communicating with said first passage, a small bore terminating at a coupling opening, and a valve seat formed at a shoulder portion between said large and small bores;
    a sliding valve having a cylindrical sliding surface which slidably fits in said small bore and has an axial passage terminating at a coupling opening, a valve head integral with said cylindrical sliding surface and movable within said large bore, and a through-hole provided through said cylindrical sliding surface adjacent said valve head, said sliding valve having a front end opposite to said valve head projecting from a front end of said body by a distance necessary for connection when said sliding valve is not connected;
    spring means provided within said large bore for biasing said valve head against said valve seat so that communication between said large bore and said axial passage is normally cut off;
    an abutment surface of said valve head made in a plane which is perpendicular to an axis of said sliding valve so that a distance traveled by said sliding valve to provide a desired area of opening space between said valve head and said valve seat is minimized; of said coupling opening; and
    a coupling surface provided on said second member around said second passage so as to oppose to said sliding valve so that said sealing member and coupling surface cooperate to keep airtight a coupling between said first and second passage through said large bore and said axial passage.

6. The flow passage coupling unit of claim 5, wherein said sealing member is an O-ring having a diameter smaller than that of said sliding surface so that said sliding valve is pressed against said coupling surface by a large force.

* * * * *